(12) United States Patent
Gayda et al.

(10) Patent No.: US 7,971,200 B2
(45) Date of Patent: Jun. 28, 2011

(54) TRANSPARENT RECOVERY OF SELF-SUSTAINED CODE-UPGRADE

(75) Inventors: Ilan Gayda, Netanya (IL); Itzhack Goldberg, Hadera (IL); Kenneth Nagin, Hamovil (IL); Nicholas D. Fifer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1024 days.

(21) Appl. No.: 11/671,631

(22) Filed: Feb. 6, 2007

(65) Prior Publication Data

US 2008/0189694 A1 Aug. 7, 2008

(51) Int. Cl.
G06F 9/44 (2006.01)
(52) U.S. Cl. .......... 717/168; 717/172; 717/174
(58) Field of Classification Search ........... 717/168–178
See application file for complete search history.

(56) References Cited

U.S. PATENT DOCUMENTS

| | | | |
|---|---|---|---|
| 4,791,661 A | 12/1988 | Donaldson et al. | |
| 5,826,075 A | 10/1998 | Bealkowski et al. | |
| 5,878,256 A | 3/1999 | Bealkowski et al. | |
| 6,058,494 A | 5/2000 | Gold et al. | |
| 6,226,809 B1 | 5/2001 | Davies | |
| 6,263,454 B1 | 7/2001 | Gold et al. | |
| 6,446,199 B1 | 9/2002 | Howe et al. | |
| 6,640,334 B1 | 10/2003 | Rasmussen | |
| 6,678,741 B1 | 1/2004 | Northcutt et al. | |
| 6,681,386 B1 * | 1/2004 | Amin et al. | 717/136 |
| 6,711,520 B2 | 3/2004 | Arnaout et al. | |
| 6,944,854 B2 | 9/2005 | Kehne et al. | |
| 7,047,448 B2 | 5/2006 | Rao et al. | |
| 7,539,712 B2 * | 5/2009 | Kawabata et al. | 1/1 |
| 2004/0103412 A1 * | 5/2004 | Rao et al. | 717/171 |

OTHER PUBLICATIONS

Suganuma et al., A region-based compilation technique for a Java just-in-time compiler, ACM, 2003, pp. 312-323.*

Schmerl, Exploiting architectural design knowledge to support self-repairing systems, ACM, 2002, pp. 241-248.*

* cited by examiner

*Primary Examiner* — Anna Deng
*Assistant Examiner* — Satish Rampuria
(74) *Attorney, Agent, or Firm* — Griffits & Seaton PLLC

(57) ABSTRACT

A defective self-sustained code-upgrade code is recovered. A relevant unset variable is set to avoid an un-initialized command failure. A relevant set variable is unset to render a second invocation of the set variable to appear as a first invocation A fix-named file is retrieved containing a plurality of code entries organized in a stanza style. The fixed-named file is executed. The plurality of stanza-organized entries are sourced by the defective code-upgrade code to change a variable which has been previously set, thereby overriding an existing process.

11 Claims, 2 Drawing Sheets

```
BUNDLE_uniqProglog=""; [[-s/persist/sm/cl/clState.L]] && [[-z "$(egrep 183996/lic/bin/cl)"]] && [[-z
"$(env|egrep uniqPROGLOG)"]] && {export uniqPROGLOG=/persist/scratch/u/$$/cl ; unset
PROLOG_EXECED_ALREADY; tail -1/persist/sm/cl/clState.L|egrep ^ CCL && export startString="-s
CCL_START -n L -f" || export startString="-s NCCL_START -n L -f"; ncl killall -9 cl; ncl killall -9 tar; rm -fr
/persist/etc/cl.lock* ; exec /lic/bin/cl "${startString}" ; echo failedToExeced ;}
```

TRANSPARENT RECOVERY OF SELF-SUSTAINED CODE-UPGRADE

BACKGROUND OF THE INVENTION

1. Field of the Invention

The present invention relates in general to computers, and, more particularly, to a method of transparently recovering defective self-sustained code-upgrades.

2. Description of the Prior Art

Data storage systems are used to store information provided by one or more host computer systems. Such data storage systems receive requests to write information to a plurality of data storage devices and requests to retrieve information from that plurality of data storage devices. It is known in the art to configure the plurality of data storage devices into two or more storage arrays.

Associated with data storage systems, as with other computing systems, are firmware and software instructions to make the systems operational, the instructions being made up of a series of lines of system code. So-called "self-sustained" code-upgrade functionality allows for currently running code to perform one of two options. First, the currently running code can opt for the code's new version (e.g., the code-load "piece" within the about to be upgraded deliverable) to carry out an entire system code-upgrade function. Secondly, the currently running code can, when the new-code level is less functional than itself, continue the code-upgrade function by itself.

However, in the case that the current code is defective, to the extent that it always decides (because of the defect and/or bad code) to carry out the remainder of a code-upgrade function, new fixes can no longer be introduced into the code-load. The existing solution to such a problem is a human intervention of some kind, which is costly, slow, and is error-prone. Another approach includes a design which allows for some dormant, "only-for emergency" code to be incorporated into the initial design in a "just-in-case" approach. Again, such an approach is problematic, as the emergency code is normally not to be used and when needed might be proven to be also defective.

Including a pre-install type of facility which is called by the code-load code itself upon starting as a possible solution means that the code-load utility would run in its own environment. As such, the code-load utility would not be able to provide a simple, pinpoint fix to the defective code-load itself. Instead, the code-load code would be altogether replaced, which could be also counterproductive in certain applications. The use of pre-installation scripts could require that the pre-install segment would need to consult an elaborate table to decide what should be an appropriate replacement for the defective code coming from code-load, such that the code-load functionality would be able to be carried out in a successful manner. Additionally, a standard software bundle would necessarily include all of the previous code-load versions, which would incur additional cost and resource allocation.

SUMMARY OF THE INVENTION

In light of the foregoing, a need exists for a computer-implemented method which allows a code-load scheme to transparently recover by tailoring existing code instead of the wholesale replacement of entire segments of code-load code. The system and method should take advantage of existing system constraints and resources to provide a cost-effective and minimally invasive solution.

In one embodiment, the present invention is a method of repairing an applying computer code, comprising executing a plurality of code entries, the entries organized according to a stanza-style, wherein the applying code sources the plurality of stanza-style entries into a running program to change a variable which has been previously set by the running program.

In another embodiment, the present invention is a method of recovering defective self-sustained code-upgrade code, comprising setting a relevant unset variable to avoid an uninitialized command failure, unsetting a relevant set variable to render a second invocation of the set variable to appear as a first invocation, retrieving a fix-named file containing a plurality of code entries organized in a stanza style, executing the fixed-named file, wherein the plurality of stanza-organized entries are sourced by the defective code-upgrade code to change a variable which has been previously set, thereby overriding an existing process.

In another embodiment, the present invention is a computer usable medium including computer usable program code for recovering defective self-sustained code-upgrade code, said computer program product including computer usable program code for executing a plurality of code entries, the entries organized according to a stanza-style, wherein the applying code sources the plurality of stanza-style entries into a running program to change a variable which has been previously set by the running program.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1 illustrates an example line of code-load code which is sourced by a preexisting code-load code level.

DETAILED DESCRIPTION OF THE DRAWINGS

Figure 2:
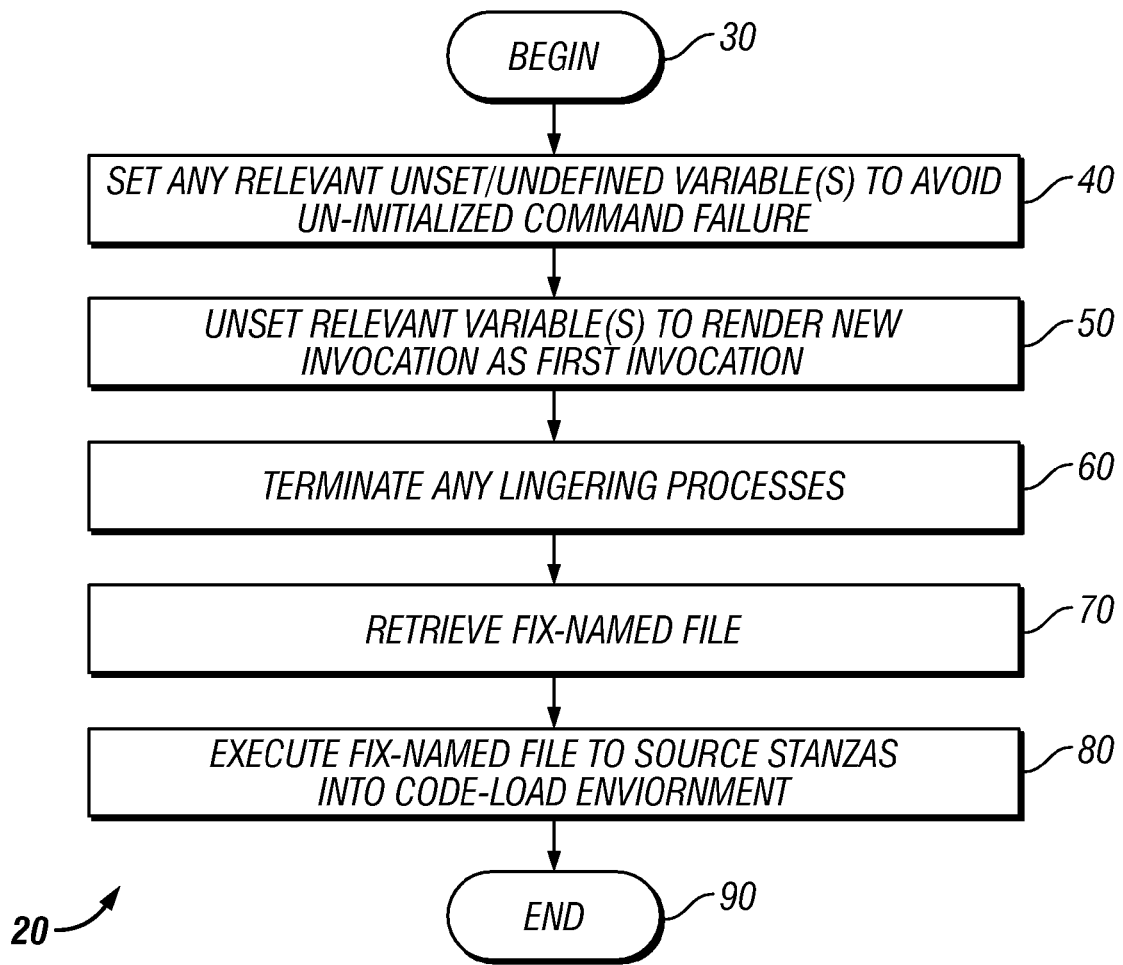
FIG. 2 illustrates a method of implementing the transparent recovery of self-sustained code-upgrades according to the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A "back door" technique can be utilized which is part of a normal code-lode execution path to recover from a defective self-sustained code-upgrade scenario. This back door technique can be used in certain cases to "transparently" recover, i.e., have the new code-load code fix up the broken/defective coming-from code-load code where the code needs a fix. The technique enables the code to be repaired without having to be replaced. The repaired code can then execute successfully, despite the existence of a defect in the coming-from code load. The technique can be used in an assortment of situations. The technique can be adapted for code-breakage cases of undefined or unset variables which cause the code-load code to take a wrong execution path.

Part of any code-upgrade procedure is the process of retrieving information about the components to be upgraded/installed from a fix-named file. For example, the fix-named file can be called a "README" file. Per relevant entries in the fix-named file, the code-load procedure knows what components, by name and by version, to extract from the bundle. A method of capturing the relevant entries involves having the relevant entries documented in a stanza-like style. An example might be: "component_name=detailedNameAndVersionInformationValueField". The relevant entries can then be evaluated as environment variables.

To accomplish this variable introduction, the code-load can "source" the stanza-like relevant entries into the code-load environment. By the term "sourcing", it is meant that another file containing scripting code to change variables that have already been set earlier by the running program is literally pulled into the code-load environment (the currently running code). By utilizing the foregoing technique, a back door is left open to the code-load implementer to recover from showstopper defects, as a user can implement such "sourced" entries to run a whole assortment of recovery commands from within the coming-from code that allows for fixing the broken coming-from code-load "on-the-fly" instead of replacing the code. In many cases, it is advantageous to repair a small, known problem than use more resource and cost intensive methods such as replacing sections of code altogether. In that case, it would mean that a proprietary, unique, or special version of a code-load code would need to be developed and tested instead of precisely resolving a minor problem, a path that a user would have taken in the first place.

To illustrate the implementation of transparently recovering defective self-sustained code-load code, consider the following example A. Example A is concerned with a code fix done to a code-load component to recognize a case where the code-load component should continue the remaining code install and upgrade, instead of using a "new" code-load version in the respective bundle because the new code-load code is somewhat inferior in respect to the "in-use" code-load code level.

Taking example A further, a "defect" is introduced to the code-load code which, because of a typographical error, causes the code-load from the defect point onwards to ignore the new code-load and stick with the old code. The typographical error causes the code-load to always take the keep-using-old-code path. Such a design, which is commonly found in code-load code, allows for such an action at the early stages of the operation, as no roll-back is required.

To rectify the situation, a user needs to intervene to terminate the existing code-load code processes and prepare the environment for an additional invocation of the old code-load code level. An additional invocation of the old code-load code level is required because it could still be the case that the old code-load code level should be allowed to continue to execute. It is impossible to determine what code level is about to be installed on any given machine. As a result, a user cannot boldly pick the new code-load code level to execute instead.

Turning to FIG. 1, an example line of code 10 taken from a fix-named file is illustrated. The line 10 is sourced by the old code-load code level. Again, by "sourcing", it is meant that another file containing scripting code is pulled into the already-executing code to change variables that have already been set earlier by the executing code. This occurs when the "/licibin/cl" command language is executed and overrides the existing process. In keeping with example A, the variable "uniqPROGLOG" results from a typographical error. The correct variable should be "uniqPROLOG". As a result, prior to executing the old code-load, the variable "uniqPROGLOG" is set to ensure that the new invocation of the command will not fail on an un-initialized variable uniqPROGLOG, as it does upon its initial invocation.

In addition, the internal "PROLOG_EXECED_ALREADY" variable is unset, to cause the code to "pretend" that the new invocation is the first invocation of the command. Finally, other relevant, running processes are terminated which may affect the correct execution of the command. In this way, the old code-load code level is given a new chance of making the correct decision.

Turning to FIG. 2, an example method 20 of implementing a transparent recovery according to the present invention is depicted. Method 20 begins (step 30), by again, setting any relevant unset or undefined variable(s) to avoid an un-initiated command failure (step 40). Next, method 20 unsets any relevant variable(s) to render the new invocation of the command as the first invocation (step 50). Any lingering processes are terminated (step 60). The fix-named file, such as "SEA.README" is then retrieved (step 70). The file is then executed, to source the stanza-like code into the code-load environment as previously described (step 80). The method 20 then ends (step 90).

The implementation of line 10 and similar lines of code allows for the recovery from an otherwise disastrous breakage, yet the defect is treated as any other mundane defect in the code which is handled as all other code defects.

Software and/or hardware to implement the method 20 previously described, such as the described setting of any relevant unset variable(s) to avoid an un-initialized command failure, can be created using tools currently known in the art. The implementation of the described system and method involves no significant additional expenditure of resources or additional hardware than what is already in use in standard computing environments utilizing common computer, storage, and network topologies, which makes the implementation cost-effective.

Implementing and utilizing the example method as described can provide a simple, effective method of providing transparent recovery of defective self-sustained code upgrade code as described, and serves to maximize the performance of a computer system. While one or more embodiments of the present invention have been illustrated in detail, the skilled artisan will appreciate that modifications and adaptations to those embodiments may be made without departing from the scope of the present invention as set forth in the following claims.

What is claimed is:

1. A method of repairing an applying computer code, comprising:
    setting a relevant unset variable to avoid an un-initialized command failure;
    unsetting a relevant set variable to render a second invocation of the set variable to appear as a first invocation;
    retrieving a fix-named file containing a plurality of code entries organized in a stanza style;
    executing the fix-named file, wherein the plurality of stanza-style entries are sourced by a defective self-sustained code-upgrade code to change a variable which has been previously set, thereby overriding an existing process;
    creating a backdoor technique dynamically by configuring a new code-load code command to repair without replacing the defective self-sustained code-upgrade code coming-from code-load code;
    terminating at least one relevant running process affecting the correct execution of the new code-load code command; and
    executing the defective self-sustained code-upgrade code successfully.

2. The method of claim 1, further unsetting a relevant set variable to render a second invocation of the relevant set variable to appear as a first invocation.

3. The method of claim 1, further including retrieving a fix-named file containing the plurality of code entries organized according to the stanza-style.

4. The method of claim 1, wherein the stanza-style entries further include scripting code to perform the variable changing function.

5. A method of recovering defective self-sustained code-upgrade code, comprising:
    setting a relevant unset variable to avoid an un-initialized command failure;
    unsetting a relevant set variable to render a second invocation of the set variable to appear as a first invocation;
    retrieving a fix-named file containing a plurality of code entries organized in a stanza style;
    executing the fix-named file, wherein the plurality of stanza-style entries are sourced by the defective self-sustained code-upgrade code to change a variable which has been previously set, thereby overriding an existing process;
    creating a backdoor technique dynamically by configuring a new code-load code command to repair without replacing the defective self-sustained code-upgrade code coming-from code-load code;
    terminating at least one relevant running process affecting the correct execution of the new code-load code command; and
    executing the defective self-sustained code-upgrade code successfully.

6. The method of claim 5, wherein the stanza-organized entries further include scripting code to perform the variable changing function.

7. A computer program product, comprising:
    a non-transitory computer usable medium including computer usable program code for recovering defective self-sustained code-upgrade code, said computer program product including:
    computer usable program code for setting a relevant unset variable to avoid an un-initialized command failure;
    computer usable program code for unsetting a relevant set variable to render a second invocation of the set variable to appear as a first invocation;
    computer usable program code for retrieving a fix-named file containing a plurality of code entries organized in a stanza style;
    computer usable program code for executing the fix-named file, wherein the plurality of stanza-style entries are sourced by the defective self-sustained code-upgrade code to change a variable which has been previously set, thereby overriding an existing process;
    computer usable program code for creating a backdoor technique dynamically by configuring a new code-load code command to repair without replacing the defective self-sustained code-upgrade code coming-from code-load code;
    computer usable program code for terminating at least one relevant running process affecting the correct execution of the new code-load code command; and
    computer usable program code for executing the defective self-sustained code-upgrade code successfully.

8. The computer program product of claim 7, further including computer usable program code for unsetting a relevant set variable to render a second invocation of the relevant set variable to appear as a first invocation.

9. The computer program product of claim 7, further including computer usable program code for retrieving a fix-named file containing the plurality of code entries organized according to the stanza-style.

10. The computer program product of claim 7, further including computer usable program code for terminating an associated process to increase the probability that the stanza-style entries are effectively sourced by the running program.

11. The computer program product of claim 7, wherein the stanza-style entries further include scripting code to perform the variable changing function.

* * * * *